G. H. BERGHMAN.

SKATE SHARPENER.

APPLICATION FILED APR. 29, 1920.

Reissued Dec. 14, 1920. 15,001.

Inventor
George H. Berghman
Williams, Bradbury, Smith & Gale
Attorney

UNITED STATES PATENT OFFICE.

GEORGE H. BERGHMAN, OF CHICAGO, ILLINOIS.

SKATE-SHARPENER.

15,001. Specification of Reissued Letters Patent. Reissued Dec. 14, 1920.

Original No. 1,335,813, dated April 6, 1920, Serial No. 331,275, filed October 17, 1919. Application for reissue filed April 29, 1920. Serial No. 377,729.

*To all whom it may concern:*

Be it known that I, GEORGE H. BERGHMAN, a citizen of the United States, residing at Chicago, in the county of Cook and State of Illinois, have invented certain new and useful Improvements in Skate-Sharpeners, of which the following is a specification.

This invention relates to that class of manually operated skate sharpeners which comprise an abrasive element and a holder therefor adapted to be held by the hand of the operator and formed with a pair of parallel guiding lips or flanges between which the runner of the skate is inserted and sharpened by effecting a relative longitudinal movement of the skate and the sharpening tool.

The general object of the invention is to provide an improved skate sharpening tool of this character which can be economically manufactured and which shall be capable of use with skate runners of various widths. More specific objects are, to provide a skate sharpener wherein adjustment of the guide flanges can be effected without involving any disassembling of the tool, to provide a skate sharpener which can be rocked laterally if desired on the runner to give a more nearly flat form to the edge, which is desirable in wide runners, and which can be adjusted and operated to create a more concave edge on narrow runners, to provide a skate sharpener wherein the abrasive element may be radially turned to any position so as to effect a uniform wear upon the surface thereof, to provide a skate sharpener wherein the abrasive element is securely held against turning while in operation by the friction of the clamp plates of the holder without requiring the use of fastening pins or similar adjuncts to hold the stone in a fixed position, and to provide a skate sharpener wherein the abrasive element shall be firmly held and shall operate without noise or rattle.

With these and other objects in view, which will be better understood from the following detailed description, my invention consists in a skate sharpening tool having the novel features of construction hereinafter fully described and defined in the appended claims.

In the accompanying drawings I have illustrated two practical embodiments of my present invention, both employing a pair of clamp-plates to hold the stone, with guide flanges for the skate runner, and an adjusting screw and spring for causing the clamp-plates to grip and securely hold the stone and for adjusting the width of the slot formed by the guide flanges. Referring to the drawings.

Figure 2:
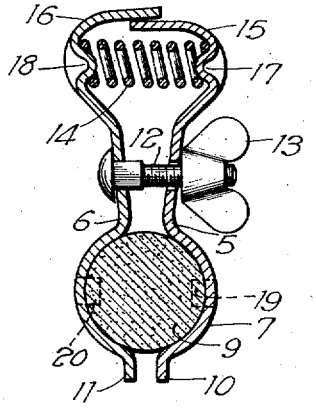
Fig. 2 is a central cross section of Fig. 1.

Referring first to the form of the invention illustrated in Figs. 1 and 2, 5 and 6 designate a pair of clamp-plates which are formed near their lower edges with oppositely disposed approximately semi-circular cheeks 7 and 8, between which is mounted the abrasive element herein shown as an emery stone 9 of circular cross section. On the lower edges of the cheeks 7 and 8 are formed a pair of radially extending lips or flanges 10 and 11 which constitute guides for a skate runner inserted between them. The intermediate portions of clamp plates 5 and 6 are apertured to receive a transversely extending screw bolt 12 provided with wing-nut 13 by which said clamp plates may be drawn together, or permitted to expand under the influence of a compression spring 14 which lies between the upper outwardly swelled portions 15 and 16 of the clamp plates, these portions being provided with indented portions 17 and 18 forming centering lugs for the ends of the spring 14. Preferably, and as shown, the upper ends of the portions 15 and 16 of the clamp plates are curled inwardly in over-lapping relation as clearly shown in Fig. 2.

At the opposite ends of the cheek members 7 and 8 are inwardly bent lugs 19 and 20 which lock the stone 9 against endwise displacement in an obvious manner.

Briefly describing the manner of using the tool, by manipulating the wing-nut 13 the guide flanges 10 and 11 are readily adjusted to the width of the skate runner to be sharpened. If the runner is narrow, the wing-nut is backed off, and the expansion of the spring 14 rocks the clamp plates on the opposite sides of the stone in such a manner as to contract the guide slot between the flanges 10 and 11. If the runner is a wide one, the wing-nut 13 is screwed up, which rocks the clamp plates in the reverse direction against the tension of the spring 14, and widens the guide slot. The slot having been adjusted to the proper width, the skate runner is inserted therein with its edge bearing against the lower surface of the stone 9 and the tool is simply drawn back and forth lengthwise of the runner until the latter has been sharpened to the desired amount. When adjusted for narrow skate runners, the guide flanges 10 and 11 are substantially parallel and have a sliding fit on the sides of the runner, so that a concave edge is ground corresponding to the convexity of the grinding surface of the stone. When the guide flanges 10 and 11 are adjusted to receive a skate runner of considerable width, they are at a slight angle to each other, and this is an advantage because permitting a slight lateral rocking movement of the tool during the sharpening which has the effect of grinding the runner with a less concavity, or more nearly flat, which is desirable on wide skate runners.

Figure 1:
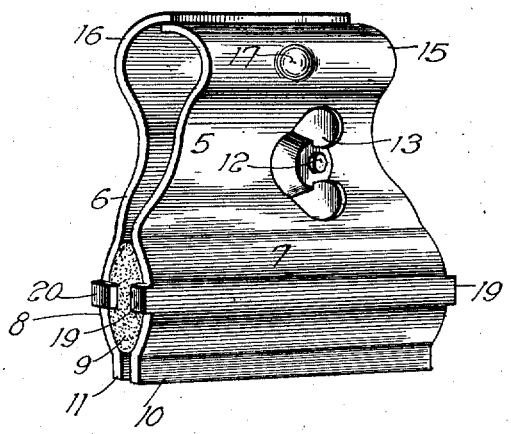
Figure 1 is a perspective elevation of one form of the invention.

In the form of the invention illustrated in Figs. 1 and 2 and above described, the clamp plates are excellently adapted to be made from sheet metal by stamping and punching processes, although I wish it to be understood that the particular character of metal used is immaterial to the invention.

Figure 4:
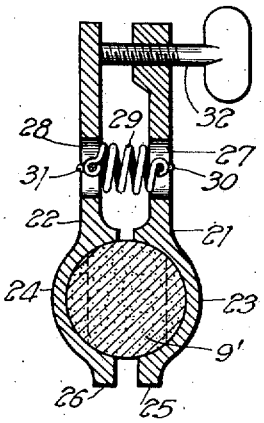
Fig. 4 is a central cross section of Fig. 3.
Figure 3:
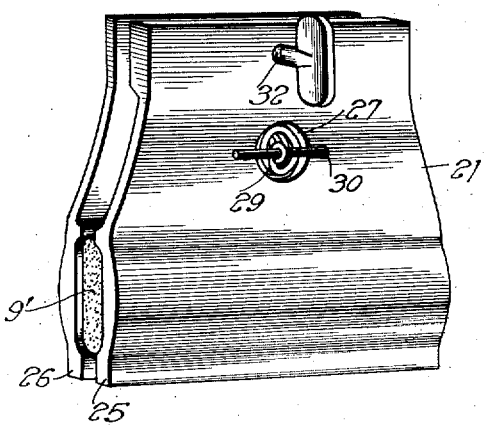
Fig. 3 is a perspective elevation of another embodiment of the invention.

In Figs. 3 and 4, I have illustrated an embodiment of the invention wherein the positions of the spring and the adjusting screw are just reversed from those shown in Figs. 1 and 2, and wherein the clamp plates preferably take the form of metal castings. In this construction, the two clamp plates 21 and 22 are formed with the cheeks 23 and 24 and the guide flanges 25 and 26, generally similar to the corresponding parts of Figs. 1 and 2, the stone 9′ being frictionally held between the cheeks 23 and 24. The plates 21 and 22 are formed with holes 27 and 28 to accommodate the ends of an expansion coil spring 29 lying between the plates 21 and 22, the ends of the spring being connected to suitable anchoring pins 30 and 31. The spring 29 tends to draw the upper portions of the clamp plates together, and this tendency is opposed by an adjusting screw 32 that is threaded through a tapped opening in the upper edge of the plate 21, which is preferably thickened as shown in Fig. 4 to afford a suitable hold for the screw, the inner end of the screw abutting against the inner face of the opposite clamp plate 22.

The mode of use of this device will be readily understood. If a narrow runner is to be sharpened, the guide slot between the flanges 25 and 26 is contracted by adjusting the screw 32 so as to force apart the upper ends of the clamp plates against the tension of spring 29. If a wide runner is to be sharpened, the slot is expanded by turning the adjusting screw 32 in the opposite direction, the spring 29 then acting to draw the upper portions of the clamp plates together and thus widen the guide slot.

It will be observed that in both forms of the invention, when adjusting the width of the guide slot, the clamp plates fulcrum on the opposite sides of the stone during their angular movements.

It is believed that the uses and advantages of the present invention will be readily understood from the foregoing description in connection with the illustration. It will be seen that for a narrow runner, the guide flanges are practically parallel, giving a more concave form to the edge of the runner, which is desirable, while for a wide or thick runner the guides are slightly divergent outwardly, enabling the tool to be rocked laterally as desired on the runner so as to give a more nearly flat form to the edge, which is also desirable in wide or thick runners. In both forms of the invention the stone is held stationary by the spring which creates ample friction between the stone and the stone holding portions of the clamp plates. When the stone wears in one place it can be turned to a new position without any disassembling of the device. In the form shown in Figs. 1 and 2 this can be accomplished by simply squeezing together the top portions 15 and 16 of the holder and grasping the ends of the stone with the thumb and finger and turning it to the position desired. In the form shown in Figs. 3 and 4, this adjustment can be effected by simply prying apart the guide lips 25 and 26, and similarly turning the stone. It will also be observed that in this device the stone not only forms the abrasive element, but it also cooperates with the clamp plates, the spring and the adjusting screw to give a solid and rigid character to the complete device so that there is no looseness nor rattle of parts with consequent noise when the device is used.

Although I have herein shown and described two practical forms in which this invention may be embodied, it will be manifest that the principle of the invention is capable of embodiment in other specifically differing forms, and hence, I reserve all such variations and modifications as fall within the spirit and purview of the appended claims.

I claim:

1. In a skate sharpener of the character described, the combination of an abrasive element, a pair of clamp-plates formed with guide flanges for a skate runner, a spring operative to force said clamp-plates into holding engagement with said abrasive element, and an adjusting screw operative to vary the spacing of said guide flanges.

2. In a skate sharpener of the character described, the combination of an abrasive element, a pair of clamp-plates formed with opposed cheeks to embrace said abrasive element and a pair of guide flanges for a skate runner below said cheeks, a spring between said clamp-plates above said cheeks operating to force the latter into holding engagement with said abrasive element, and means for adjusting the angular relation of said clamp-plates to each other whereby to vary the width of the slot between said guide flanges.

3. In a skate sharpener of the character described, the combination of an abrasive element, a pair of clamp-plates formed with opposed cheeks to embrace said abrasive element and with a pair of guide flanges for a skate runner below said cheeks, a compression spring between the upper portions of said clamp-plates, and an adjusting screw connecting said clamp-plates between said spring and said cheek.

4. In a skate sharpener of the character described, the combination of an abrasive element, a pair of clamp-plates formed with opposed cheeks to embrace said abrasive element and with a pair of guide flanges for a skate runner below said cheeks, said clamp-plates also having outwardly swelled upper portions, a compression spring between said outwardly swelled upper portions, and a draw-bolt and nut connecting the intermediate portions of said clamp-plates between said swelled upper portions and said cheeks.

5. In a skate sharpener of the character described, the combination of an abrasive element substantially round in cross-section, a pair of clamp-plates formed with opposed approximately semi-circular cheeks to embrace said abrasive element and with a pair of guide flanges for a skate runner below said cheeks, said clamp-plates also having outwardly swelled upper portions formed with inwardly turned overlapping edges, a compression spring between said outwardly swelled upper portions, a draw-bolt and nut connecting the intermediate portions of said clamp-plates between said swelled upper portions and said cheeks, and stop lugs on the ends of said clamp-plates overlapping the ends of said abrasive element.

6. A skate sharpener comprising a cylindrical abrasive element, a pair of clamp-plates fulcrumed upon said abrasive element, the adjacent edges of said clamp-plates on one side of said abrasive element forming guide flanges for receiving a skate runner, and means acting upon said clamp-plates for adjusting said clamp-plates about said abrasive element to vary the spacing of said guide flanges.

7. A skate sharpener comprising a cylindrical abrasive element, a pair of clamp-plates fulcrumed upon said abrasive element, the adjacent edges of said clamp-plates on one side of said abrasive element forming guide flanges for receiving a skate runner, and means for holding said clamp-plates in any adjusted position to maintain said guide flanges in spaced relation.

8. A skate sharpener comprising a cylindrical abrasive element, a pair of clamp-plates fulcrumed upon said abrasive element, the adjacent edges of said clamp-plates on one side of said abrasive element forming guide flanges for receiving a skate runner.

9. A skate sharpener comprising an abrasive element, a pair of clamp-plates fulcrumed on said abrasive element, the said clamp-plates comprising guide flanges for receiving a skate runner, and means for securing said clamp-plates in any adjusted relation to maintain the spacing of said guide flanges.

10. A skate sharpener comprising an abrasive element, a pair of clamp-plates engaging opposite sides of said abrasive element and fulcrumed thereon, the said clamp plates comprising guide flanges for receiving a skate blade, and means for holding said plates in adjusted relation on said abrasive element.

In witness whereof, I hereunto subscribe my name this 23rd day of April, 1920.

GEORGE H. BERGHMAN.